United States Patent Office 3,634,248
Patented Jan. 11, 1972

3,634,248
AROMATIC AMINE DERIVATIVES AS STABILIZERS IN ORGANIC COMPOSITIONS
Harry J. Andress, Jr., Pitman, N.J., assignor to Mobil Oil Corporation
No Drawing. Filed June 21, 1968, Ser. No. 738,803
Int. Cl. C10m 1/20, 1/32
U.S. Cl. 252—51.5 A    11 Claims

ABSTRACT OF THE DISCLOSURE

Novel derivatives of aromatic amines are obtained by reacting a primary or secondary amine with an aldehyde or boric acid. The resulting aldehyde product or borate ester are effective stabilizers for organic media at high temperatures.

BACKGROUND OF THE INVENTION

Field of the invention

This invention relates to aromatic amine derivatives and, in particular, it relates to novel aromatic amine derivatives as stabilizers for organic base media.

Description of the prior art

U.S. Pat. No. 3,034,876 describes alkylene diamine salicylaldehyde and succinic anhydride reaction products for use in jet fuels. U.S. 2,867,515 describes formaldimines of tertiary alkyl primary amines. These compounds are used in fuel oils. U.S. 3,068,083 describes in the salicylaldehydepropylenediamine reaction products in fuels. U.S. 3,014,870 describes physical mixtures of alkyl boronic acids and aromatic amines. Such products or mixtures while affording effective performance in fuels to prevent clogging, are not deemed to have sufficient high temperature stabilizing properties in lubricating oils, particularly those oils used under high temperature conditions. Other organic liquid media require high temperature stability, such as fluids for hydraulic systems, heat exchange fluids and the like. These fluids must be able to perform continually under extreme conditions often exposed to the effects of oxygen deterioration. The use of antioxidants and stabilizers, such as phenyl alpha naphthylamine, as described in U.S. Pat. No. 3,247,111, has provided some protection for certain fluids, such as synthetic ester lubricants. However, the advent of newer generation motors and other mechanical systems creates even higher temperature requirements. Hence even these aromatic secondary amines alone are not always capable of sustained performance.

SUMMARY OF THE INVENTION

It has now been discovered that new and useful derivatives of primary or secondary aromatic amine derivatives in organic base media are obtained by reacting the said amine with an aldehyde or boron compound. These reaction products reduce oxidative deterioration of normally susceptible organic base media.

DESCRIPTION OF SPECIFIC EMBODIMENTS

The aromatic amines used in this invention are those having the structure

wherein R may be hydrogen, or a hydrocarbyl group, including alkyl or cycloalkyl having from 1 to about 20 carbon atoms, or aralkyl, aryl or alkaryl having from 1 to about 20 carbon atoms in the alkyl substituent, and Ar is an aryl hydrocarbon, including aryl or alkaryl having from 1 to about 20 carbon atoms in the alkyl group. Such amines an aniline, alpha or beta naphthaylamine, diphenyl amine, phenyl tolyl amine, ditolyl amine, dioctyldiphenyl amine, di-alpha- or beta-naphthylamine, phenyl alpha- or beta-naphthylamine, N-phenyl butyl amine, N-phenyl octyl amie, di(biphenyl)amine, and the like. Preferably R is aryl or alkaryl.

Also of use in preparing the products of this invention are aromatic amines which have been previously treated in a dehydrocondensation reaction by heating the amine in the presence of an organic peroxide, having from 1 to about 20 carbon atoms, such as mono-alkyl hydroperoxide and dialkyl peroxides, mono-aryl hydroperoxides, diaryl peroxides, peroxy acids and the like. Of particular interest are the di-tertiary-alkyl peroxides, most preferably tertiary butyl peroxides and the aromatic peroxides, such as benzoyl peroxide. Other peroxides however, may be used conveniently, such as benzoyl hydroperoxide, alkylperbenzoate esters, butyl hydroperoxide, dioctyl peroxide, acetyl peroxide, and so forth. One of the essential reaction products of this condensation reaction is believed to be a polymer, such as a dimer, of the amine. It is theorized that, although a mixture of several products may be obtained, the hydrogen atoms attached to the nitrogen atoms remain intact to a sufficient degree to enter into the subsequent reaction with aldehyde or boric acid.

One of the co-reactants for the aromatic amine is an organic aldehyde having the general structure R'—CHO in which R' is hydrogen or a hydrocarbyl radical or halo or hydroxy derivatives thereof. More specifically, R' includes alkyl, aralkyl, aryl and alkaryl and the halo and hydroxy derivatives having from 1 to about 20 carbon atoms. Included as characterizing this reactant are formaldehyde, acetaldehyde, propionaldehyde, butyraldehyde, and so forth. Derivatives of these aldehydes may be used, including paraformaldehyde (polyoxymethylene), which produces the aldehyde group under reaction conditions. The suitable aromatic aldehydes include benzaldehyde, naphthiocaldehyde, phenylacetaldehyde, crotonaldehyde, and salicylaldehyde. Salicylaldehyde is preferred.

The reaction between the amine and the aldehyde is believed to produce the imine linkage. If the amine is primary, a reaction product would have the structure

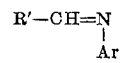

wherein R' and Ar are described previously. If a secondary amine is used, the aldehyde may react with two moles of the amine, in which case the product would consist of two amino groups linked through the methylene radical from the aldehyde, such as

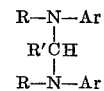

Both structures come within the scope of the present invention, and the products having such structures are useful as high temperature stabilizers.

The primary or secondary amines described in this invention may also be reacted with boric acid or an organic derivative thereof in which at least one hydroxy group of the acid remains to react with the said amine. Boric acid or partial borate esters have the structure

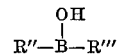

wherein each of the R″ and R‴ groups may be hydroxide or alkyl or alkoxy having from 1 to about 10 carbon atoms. The most preferred reactant is when both R'' and R''' are hydroxy, that is boric acid. The mole ratio may be less than 1:1 of N-hydrogen atom per β-hydroxy groups; in other words, all of the available hydroxy groups of the boron compound need not be substituted by amino.

The reaction between the amine and the aldehyde or boric acid reactant may be conducted at temperatures ranging from about 75° to about 300° C. The two reactants are simply mixed in the same reaction vessel with agitation and water of reaction is removed. A trap at the end of a reflux condenser may be employed in the equipment to indicate the progress of the reaction. If desired, the reaction mixture may be diluted with an organic solvent inert to reactants for better mixing and temperature control. Such solvents as benzene, toluene, ether, n-hexane, and the like may be used. A solvent which will azeotrope with the water may be conveniently employed. However, the reaction can easily be conducted with the two reactants alone. The reaction product need not be subjected to intricate refining aside from filtering. If desired, it may be added directly to the base fluid in which it is to be used.

The novel products of this invention may be added to petroleum distillates, such as mineral lubricating oils and greases made therefrom, and to liquid hydrocarbon fuels. Preferably, the additives of this invention are employed in synthetic lubricants, such as those derived from alkane hydrocarbons, olefin hydrocarbons and their polymers, polyglycol ethers, silicone fluids, polyacetal fluids, and the like. Of primary interest in this invention are the compositions of these additives in synthetic ester lubricants. These lubricants are preferably prepared from esters of beta-hindered polyhydric alcohols and monocarboxylic acids or mixtures thereof having from 2 to about 20 carbon atoms. Such esters have the structure

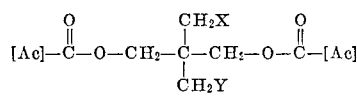

wherein each Ac is the remainder of the acid group, having from 1 to about 19 carbon atoms, and may be the same or different, and X and Y individually may be hydrogen or alkyl, having from 1 to about 5 carbon atoms or

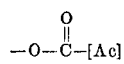

Preferably, the monocarboxylic acid is an aliphatic acid having from about 4 to about 10 carbon atoms. Dicarboxylic acid esters may also be used, such as di-2-ethylhexyl sebacate and dihexyl adipate, and the like.

The compositions of this invention may contain from about 0.01% to about 10% by weight, and preferably from about 0.5% to about 5% by weight, of the additives.

The following examples describe specific illustrations of the manner of preparing the novel compounds of this invention, but are not deemed a limitation in any way of the scope of the invention.

EXAMPLE 1

In a suitable reactor equipped with a condenser, thermometer and a stirrer and a water condensate collector were added 81 grams (0.57 mole) of alpha naphthylamine, 69 grams (0.57 mole) of salicylaldehyde, and 100 cc. of xylene diluent to aid in removal of water. The reaction mixture was stirred at 200° C. until evolution of water ceased. At the completion of this period, the remaining product was a dark crystalline product at 25° C. in amount of approximately theoretical yield.

EXAMPLE 2

Into a reactor used in Example 1 were added 38 grams (0.3 mole) of salicylaldehyde and 136 grams (0.6 mole) of phenyl alpha naphthylamine in the presence of about 44 grams (25% by weight) of an acidic alumino-silica-type clay ("Super-Filtrol"). The reaction mixture was heated to 220° C. and held at that temperature until odor of salicylaldehyde disappeared. The resulting product was separated from the clay as a dark, crystalline product at 25° C.

*Analysis.*—N, 4.9%.

EXAMPLE 3

Using the same reactor as in Example 1, 33 grams (0.27 mole) of salicylaldehyde was reacted with 118 grams (0.54 mole) of phenyl beta naphthylamine in the presence of about 100 cc. of xylene at 200° C. The procedure was the same as that for example 1. The temperature was maintained until evolution of water ceased. The resulting product was a dark crystalline product at 25° C.

EXAMPLE 4

Phenyl alpha naphthylamine was heated at 150° C. in the presence of di-t-butyl peroxide at a mole ratio of 1:1. The resulting product had a molecular weight of about 440, indicating the presence of a phenyl alpha naphthylamine dimer. About 82 grams (0.2 mole) of the dimer were reacted with 24 grams (0.2 mole) of salicylaldehyde in the presence of 25% of the clay at 230° C. The reaction mixture was maintained at that temperature until odor of salicylaldehyde disappeared. The resulting product, a dark, crystalline product at 25° C., was the salicylaldimine of phenyl alpha naphthylamine dimer.

EXAMPLE 5

In a reactor similar to that used in Example 1 were added 100 grams (0.46 mole) of phenyl alpha naphthylamine, 7 grams (0.23 mole) of paraformaldehyde, and 100 cc. of benzene as diluent. The reaction mixture was heated at 130° C. until evolution of water ceased. The resulting product was a dark, crystalline product at 25° C.

EXAMPLE 6

The reaction of Example 5 was repeated using 100 grams (0.46 mole) of phenyl beta naphthylamine, 7 grams (0.23 mole) of paraformaldehyde and 100 cc. of benzene at a temperature of 130° C. The resulting product was a dark, crystalline product at 25° C.

EXAMPLE 7

Into a reactor similar to that used in Example 1 were added 131 grams (0.6 mole) of phenyl beta naphthylamine, 19 grams (0.3 mole) of boric acid, and 100 grams isopropanol. The reaction mixture was slowly heated to 200° C. over a period of 5 hours. The resulting product was a dark, crystalline product.

EVALUATION OF THE PRODUCTS

It is known that oxidation of organic materials, such as lubricating oils, can produce both sludge and acidic products. Both the increased viscosity and acidity of an oil could detract from its performance. The reduction of these characteristics is desirable. Accordingly, the products of this invention were tested as oxidation inhibitors in an ester lubricant in a catalytic oxidation test. In this test, an oil sample is subjected to 425° F. temperature for 24 hours during which time air is passed through the sample at a rate of 5 liters per hour. Present in the test sample are items of iron, aluminum, copper and lead, metals which are used in construction of engines and which may catalyze oxidative deterioration of the fluid. The kinematic viscosity and acid number of the test sample are measured before and after the test as indication of the formation of any oxidation products caused by the conditions of the test. The ester used in this test was a pentaerythritol ester derived from mixed $C_5$ and $C_9$ monocarboxylic acids.

The following results were obtained:

| Additive | Conc., wt. percent | Acid No. | Percent increase of viscosity at 210° F. |
|---|---|---|---|
| None | 0 | 6.6 | 265 |
| Example: | | | |
| 1 product | 4 | 2.8 | 38 |
| 2 product | 1 | 1.1 | 6 |
| 3 product | 1 | 1.0 | 16 |
| 4 product | 2 | 0.9 | 6 |
| 5 product | 1 | 0.8 | 0 |
| 6 product | 1 | 0.8 | 12 |
| 7 product | 1 | 0.8 | 1.5 |
| Phenyl alpha naphthylamine | 1 | 2.7 | 62 |

The products of this invention are thus shown to have effective antioxidants and high temperature stabilizing properties. They also may be used in combination with other additives, such as detergents, extreme pressure additives, metal deactivators and other conventional additives for industrial organic fluids, such as lubricants.

Having described my invention, I claim:

1. An organic composition comprising a major proportion of a synthetic ester lubricant and an amount sufficient to provide high temperature stability thereto of a product of a reaction between (1) an amine selected from the group consisting of (a) amines of the formula

wherein: R is selected from the group consisting of hydrogen, alkyl or cycloalkyl having from 1 to about 20 carbon atoms, aryl and aralkyl or alkaryl having from 1 to about 20 carbon atoms in the alkyl portion; and Ar is selected from the group consisting of phenyl, naphthyl and the alkyl-substituted members thereof, said alkyl having from 1 to about 20 carbon atoms; and (b) the dehydrocondensed product of said amine produced by reacting same with an organic peroxide having from 1 to about 20 carbon atoms in the organic group, and (2) an aldehyde of the formula

R'CHO wherein R' is selected from the group consisting of alkyl, aralkyl, aryl and alkaryl having from 1 to about 20 carbon atoms, wherein in the reaction the amine is present to the extent of at least about one mole thereof for each mole of aldehyde, and wherein the reaction is carried out from about 75° C. to about 300° C.

2. The composition of claim 1 wherein the amine is a phenyl naphthylamine.

3. The composition of claim 1 wherein the amine is a naphthylamine.

4. The composition of claim 1 wherein the amine is a dehydrocondensed dimer obtained by reacting a phenyl naphthylamine with a di-tertiary-alkyl peroxide.

5. The composition of claim 1 wherein the aldehyde is formaldehyde.

6. The composition of claim 1 wherein the aldehyde is salicylaldehyde.

7. The composition of claim 1 wherein the reaction product is produced by reacting salicylaldehyde with an amine selected from the group consisting of naphthylamine, a phenyl naphthylamine, and a dehydrocondensed dimer of a phenyl naphthylamine.

8. The composition of claim 1 wherein the reaction product is produced by reacting formaldehyde with a phenyl naphthylamine.

9. The composition of claim 1 wherein the amine is present to the extent of from 1 to about 2 moles thereof per mole of aldehyde.

10. An organic composition comprising a major proportion of a liquid hydrocarbon fuel and an amount sufficient to provide high temperature stability thereto of a product of reaction between (1) a product obtained by reacting (a) an amine of the formula

wherein R is selected from the group consisting of hydrogen, alkyl or cycloalkyl having from 1 to about 20 carbon atoms, aryl and alkaryl or aralkyl having from 1 to about 20 carbon atoms in the alkyl portion, and Ar is selected from the group consisting of phenyl, naphthyl and the alkyl-substituted members, wherein said alkyl has from 1 to about 20 carbon atoms and (b) an organic peroxide having from about 1 to 20 carbon atoms in the organic group, and (2) an aldehyde of the formula

R'CHO wherein R' is selected from the group consisting of alkyl, aralkyl, aryl and alkaryl having from 1 to about 20 carbon atoms, and wherein in the reaction, the amine is present to the extent of at least one mole thereof for each mole of aldehyde, and wherein the reaction is carried out from about 75° C. to about 300° C.

11. The composition of claim 10 wherein the amine is present to the extent of from 1 to about 2 moles thereof per mole of aldehyde.

References Cited

UNITED STATES PATENTS

| | | | |
|---|---|---|---|
| 2,206,454 | 7/1940 | Craig | 44—73 X |
| 2,264,894 | 12/1941 | Shoemaker et al. | 44—73 X |
| 3,093,585 | 6/1963 | Low et al. | 252—51.5 X |
| 3,412,029 | 11/1968 | Andress et al. | 252—51.5 |
| 3,492,233 | 1/1970 | Hepplewhite et al. | 252—51.5 A |
| 2,223,411 | 12/1940 | Fuller et al. | 252—50 |
| 2,511,747 | 6/1950 | Smith et al. | 252—50 |
| 2,511,748 | 6/1950 | Smith et al. | 252—50 |
| 2,867,515 | 1/1959 | Andress | 44—63 |
| 2,999,064 | 9/1961 | Sluhan | 252—49.6 |
| 3,014,869 | 12/1961 | Reynolds et al. | 252—49.6 |
| 3,014,870 | 12/1961 | Reynolds et al. | 252—49.6 |
| 3,034,876 | 5/1962 | Gee et al. | 44—62 |
| 3,100,221 | 8/1963 | Kay et al. | 252—49.6 |
| 3,125,525 | 3/1964 | Siegart et al. | 252—49.6 |
| 3,247,111 | 4/1966 | Oberright et al. | 252—50 |
| 3,282,840 | 11/1966 | Foster et al. | 252—50 |
| 3,371,039 | 2/1968 | Cyba | 44—63 X |

FOREIGN PATENTS

| | | | |
|---|---|---|---|
| 269,840 | 1/1928 | Great Britain | 252—50 |

DANIEL E. WYMAN, Primary Examiner

W. J. SHINE, Assistant Examiner

U.S. Cl. X.R.

44—73; 252—50, 51.5 R